United States Patent Office 2,770,277
Patented Nov. 13, 1956

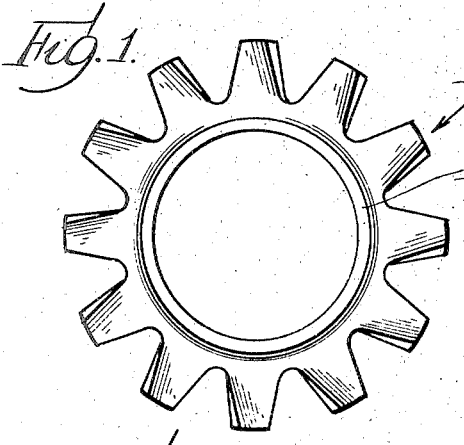
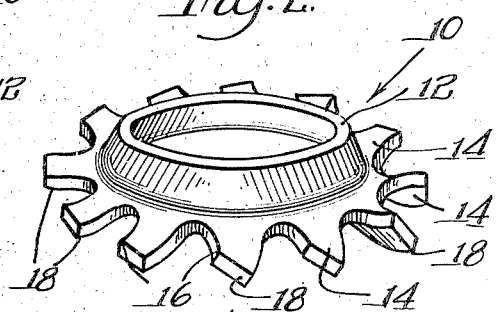
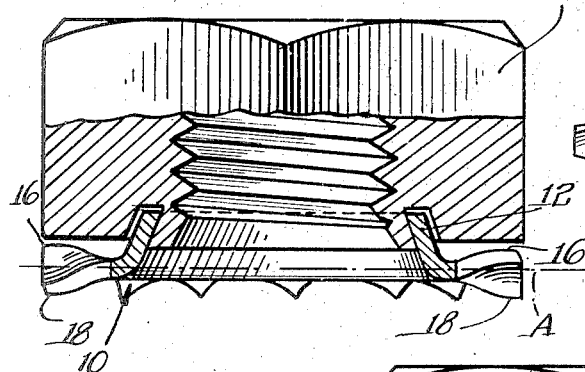
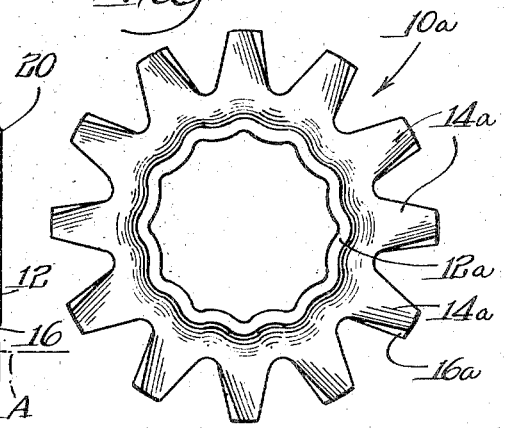
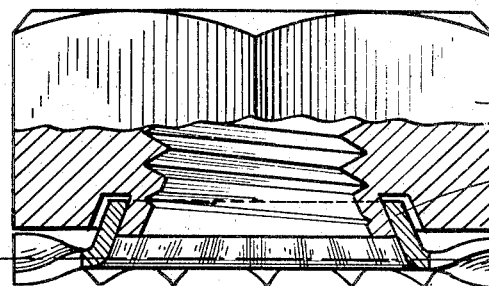
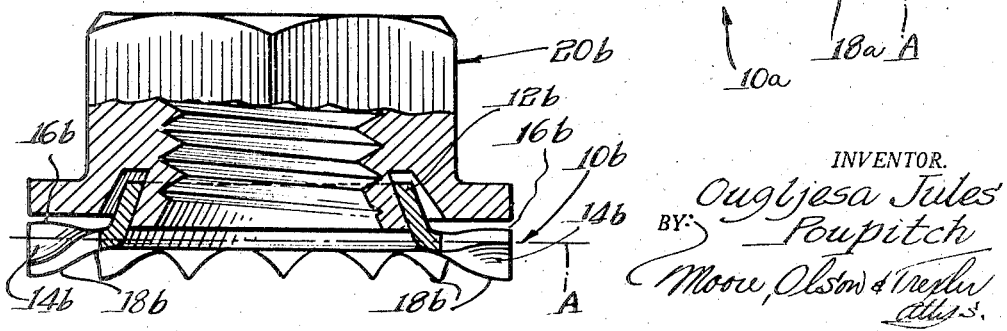

2,770,277

LOCK WASHER WITH UNEQUALLY PROJECTING TEETH

Ougljesa Jules Poupitch, Itasca, Ill., assignor to Illinois Tool Works, Chicago, Ill., a corporation of Illinois Application October 23, 1951, Serial No. 252,589

2 Claims. (Cl. 151—35)

This invention relates generally to lock washers and more particularly to lock washers adapted for preassembly with the clamping side of nuts.

The present invention is a continuation-in-part of applicant's copending applications Serial No. 106,255, filed July 22, 1949, now Patent No. 2,576,906, for Fastener Unit, Serial No. 106,257, filed July 22, 1949, now Patent No. 2,619,146, for Fastener Unit, and Serial No. 209,020, filed February 2, 1951, now abandoned, for Fastener Unit. The aforesaid copending applications are directed to fastener units consisting of a preassembled nut and washer, whereas the present application is directed specifically to lock washers per se.

The present invention is primarily concerned with lock washers having an internal body structure designed for accommodation by a complementary annular nut recess and a locking section which extends radially outwardly from and is supported by said body portion.

More specifically, the invention contemplates a very practical lock washer arrangement wherein the aforesaid internal body portion is shaped not only to accommodate itself for reception by a complementary annular nut recess, but also so as to lend increased strength against forces tending to distort the shape of the washer body.

It is an important object of the present invention to provide a lock washer of the type set forth above, wherein both strength and practical adaptation as a washer retaining device for association with a complementary nut are accomplished by the use of a continuous annular conoidal form of limited axial extent.

It is a further object of the present invention to provide in association with the above mentioned conoidal washer body a novel arrangement of washer teeth, wherein the washer teeth on the side oppositely disposed from the conoidal body project a greater distance than the teeth on the opposite side of said plane, whereby to reduce to a minimum the axial dimension of the conoidal body.

A still further object of the present invention is to provide a lock washer having a continuous conoidal body as referred to above which for certain applications is provided with smooth uninterrupted internal and external peripheral surfaces, and which for other applications, wherein the washer may be secured against rotation with respect to a complementary nut, is provided with a series of circumferentially spaced projections and depressions.

The foregoing and other objects and advantages will be more apparent from the following detailed description, wherein—

Fig. 1 is a plan view of a lock washer which is representative of one embodiment of the present invention;

Fig. 2 is a perspective view of the washer of Fig. 1;

Fig. 3 discloses the washer of Figs. 1 and 2 in central transverse vertical section associated with the annularly recessed face of a complementary nut;

Fig. 4 is a plan view similar to Fig. 1 of a lock washer of modified form, wherein the continuous conoidal annulus is undulated to provide projections and depressions;

Fig. 5 is a view similar to Fig. 3 disclosing the washer of Fig. 4 preassembled with the annularly grooved complementary nut; and Fig. 6 is a view similar of Figs. 3 and 5 disclosing in section a lock washer of still further modified form preassembled with the clamping side of a complementary nut.

Referring now to the drawing more in detail wherein like numerals have been employed to designate similar parts throughout the various figures, it will be seen that one embodiment of the present invention is designated generally by the numeral 10 in Figs. 1 to 3, inclusive. This washer embodiment 10 comprises an inner rigid sheet metal body 12 in the form of an inwardly inclined continuous conoidal annulus. Formed integrally with and extending radially outwardly from the narrow annular base of said conoidal body 12 is a locking section which in the disclosed embodiment comprises a plurality of marginal prongs 14 extending radially outwardly from the base of the body 12 and with the roots of the prongs spaced apart around the base. Each of the prongs 14 is axially deflected or twisted so as to present a series of projections or locking teeth 16 which extend beyond a plane coincident with the body base, as indicated by the dot and dash line in Fig. 3, said line being designated by the letter A. Teeth 18 presented by the opposite corners of the prongs 14 extend beyond the opposite side of the plane A.

For purposes of illustration the washer 10 in Fig. 3 is shown in operative association with the clamping side of a threaded clamping member or nut 20. By having the conoidal washer body properly proportioned both in inclination and height, the extent to which the free margin of this body projects into a complementary recess in the nut 20 is reduced to a minimum. In fact, it is preferable to so proportion the height of the conoidal annulus that it is not greater than the radial width of the locking section or washer prongs 14, and at the same time the height of the body must be substantially greater than the degree to which the teeth or projections 16 extend beyond the plane A coincident with the base of the body. In other words, these structural dimensional characteristics must be such as to provide a properly positioned and proportioned inner peripheral surface on the body 12 in the vicinity of the free margin of the body so as to provide a conoidal washer retaining shoulder or surface.

It will also be noted that the present invention contemplates a washer member of the type just described in which the free edge of the conoidal body lies below a plane coincident with the inner corner of said edge. This will be clearly apparent from Fig. 3, where it will be seen that in the disclosed embodiment the aforesaid free edge actually presents a narrow annular surface which is coincident with a plane including the inner edge defining said surface. Obviously, in instances where it is required, the corner defining the outer margin of said edge may be further chamfered or cut away. In other words, it is important that this edge which defines the outer margin of the free edge of the body does not project axially outwardly from the washer base a greater distance than the inner corner defining said edge. In this manner the required height of the washer body, and consequently the required depth of the nut recess adapted to accommodate the free margin of said body, is reduced to an absolute minimum.

Attention is also directed to the fact that in the washer disclosed in Figs. 1–3, inclusive, the washer retaining shoulder or surface presented by the inner periphery of the conoidal body in the vicinity of its free margin is smooth. This renders the washer usable in instances where it is desirable to maintain a free running or rotatable coupling of the washer with a complementary nut. It will also be noted that the locking section of the washer 10 consists of a plurality of circumferentially spaced prongs which are so deflected or twisted as to position the work engaging projections or teeth 16—18 thereof equidistant from opposite sides of the plane A. When these prongs are subjected to forces tending to untwist them, such forces are also transmitted to the washer body which directly supports the prongs. Hence, the body must be sufficiently rigid to withstand any tendency to become distorted. By having the body in the form of a continuous conoidal annulus, the required strength is obtained even with the use of relatively thin sheet metal stock. By holding the height of this continuous conoidal annulus to a minimum, the stresses to which the inner margin of the body is subjected during the forming of the washer are also reduced to a minimum. Thus the body of continuous conoidal form makes for utmost in body strength and ease of manufacture.

In Figs. 4 and 5 a slightly modified washer structure is shown which is designated generally by the numeral 10a. This washer 10a, like the washer 10, incorporates a continuous annular conoidal body 12a and a plurality of circumferentially spaced prongs 14a presenting a locking section extending radially outwardly from the base of the body 12a. Also, each of the prongs 14a are axially deflected or twisted so as to present oppositely disposed projections or teeth 16a and 18a. The washer 10a differs only from the washer 10 in that the continuous conoidal body 12a is undulated so as to provide a series of alternate projections and indentations, as seen clearly in Fig. 4. The purpose of these projections and indentations is to form an interlock with a complementary peripheral surface of a rotary threaded fastener, such as a nut 20a. The interlocking of the projections and indentations along the inner periphery of the washer body adjacent its free margin with complementary projections and indentations of a nut body secures the washer and nut against relative rotation. There are certain applications where this type of fastening is desirable, and the washer 10a serves adequately to fulfill the requirements of such applications.

Fig. 6 discloses a still further modification of the washer, said washer being designated generally by the numeral 10b. The only structural difference between the washer 10b and the washer 10 is that the teeth 16 of the washer 10 project beyond the plane A the same distance as the opposite teeth 18 project beyond said plane, whereas in the washer 10b the corresponding teeth 16b project beyond the plane A a distance which is less than the extent to which the teeth 18b project beyond said plane. In all other respects the structure of the washer 10b is identical with the washer 10, and therefore the various elements of the washer 10b have been given numbers corresponding with the like elements of washer 10 and the suffix "b" has been added.

From the foregoing it will be apparent that the present invention contemplates washers of improved practical design which lend themselves structurally for association with the recessed clamping side of a fastener such as a nut. It will also be clear that the arrangement of the washer body and locking section is such as to adapt the washer to withstand the severe strains and stresses to which it is normally subjected when in use. As previously pointed out, the use of the continuous internal conoidal annulus in association with the locking section enhances greatly the practical utility of the washer.

While for purposes of illustration certain specific structural features have been shown, it will be apparent that the invention is not limited to the specific disclosures, but is capable of other modifications and changes without departing from the spirit and scope of the appended claims.

The invention is hereby claimed as follows:

1. A lock washer of sheet metal stock adapted to be retained in preassembled relationship with a rotary fastener having a clamping surface with an annular recess therein; and said lock washer comprising an inner rigid body portion in the form of an inwardly inclined continuous uninterrupted conoidal annulus substantially nondeformable during ordinary use, a narrow uninterrupted annular base portion projecting from the larger end of said conoidal annulus, and a plurality of locking teeth formed integral with and extending radially from said base portion, said teeth having the roots thereof spaced apart around the edge of said base portion and being oppositely twisted to present locking edges projecting axially beyond opposite sides of said base portion, the locking edges of the teeth on the side of the washer opposite from the conoidal annulus projecting a greater distance from the adjacent side of said base portion than the locking edges extend from the opposite side of the base portion, the height of said conoidal annulus being greater than the axial extent of said teeth but not greater than the radial extent of the teeth and base portion so as to provide a properly positioned and proportioned inner washer retaining conoidal surface in the vicinity of the free margin of smaller diameter oppositely disposed from said base portion.

2. A lock washer as claimed in claim 1, wherein the conoidal annulus is provided at least around the free margin thereof with circumferentially spaced projections and indentations.

References Cited in the file of this patent

UNITED STATES PATENTS

| | | |
|---|---|---|
| 1,228,130 | Price | May 29, 1917 |
| 1,561,880 | Morrison et al. | Nov. 17, 1925 |
| 1,924,695 | Olson | Aug. 29, 1933 |
| 1,944,595 | Crowther | Jan. 23, 1934 |
| 2,228,284 | Olson | Jan. 14, 1941 |
| 2,424,208 | Poupitch | July 15, 1947 |
| 2,576,906 | Poupitch | Nov. 27, 1951 |
| 2,619,146 | Poupitch | Nov. 25, 1952 |

FOREIGN PATENTS

| | | |
|---|---|---|
| 1,315 of 1901 | Great Britain | Jan. 21, 1901 |
| 244,676 | Great Britain | Dec. 24, 1925 |